US005308985A

United States Patent [19]

Lee

[11] Patent Number: 5,308,985

[45] Date of Patent: May 3, 1994

[54] WIDE-ANGLE PASSIVE INFRARED RADIATION DETECTOR

[75] Inventor: Wade Lee, Alamo, Calif.

[73] Assignee: Intelectron Products Company, Hayward, Calif.

[21] Appl. No.: 851,590

[22] Filed: Mar. 16, 1992

Related U.S. Application Data

[63] Continuation-in-part of Ser. No. 786,135, Oct. 31, 1991, abandoned.

[51] Int. Cl.[5] .................... G01J 5/08

[52] U.S. Cl. .................... 250/353; 250/342

[58] Field of Search .................... 250/353, 342, 338.1, 250/221

[56] References Cited

U.S. PATENT DOCUMENTS 4,268,752 5/1981 Herwig et al. .................... 250/353

5,089,704 2/1992 Perkins .................... 250/353

FOREIGN PATENT DOCUMENTS 0077723 4/1986 Japan .................... 250/353

*Primary Examiner*—Paul M. Dzierzynski

*Assistant Examiner*—Richard Hanig

*Attorney, Agent, or Firm*—Elliot B. Aronson

[57] ABSTRACT

An infrared radiation detector using a reflector comprising a mirrored conic section or faceted reflector to increase the field of view of a sensor. The reflector is mounted in the normal field of view of the sensor, and is truncated so as prevent the reflector from blocking radiation directly in front of the detector. The detector is mounted either on a wall with a nearly 180 degree field of view, or on a post with a nearly 360 degree horizontal field of view and a nearly 180 degree vertical field of view.

9 Claims, 8 Drawing Sheets

WIDE-ANGLE PASSIVE INFRARED RADIATION DETECTOR

CROSS REFERENCE TO RELATED APPLICATIONS

This application is a continuation-in-part of Ser. No. 07/786,135, filed Oct. 31, 1991 now abandoned.

BACKGROUND OF THE INVENTION

The present invention relates to infrared radiation detectors. Infrared detectors are often used to sense the presence of people in connection with home burglar alarm systems or automated room lighting systems. To prevent an intruder from escaping detection by a burglar alarm system, a detector must be able to detect radiation coming from anywhere within a wide field of view.

Unfortunately, with planar sensors, sensitivity drops as the angle between the radiation beam and a line normal to the plane increases. This is because the cross section of the sensor available for absorbing radiation decreases as the angle increases. One solution is to use a detector with several sensors fixed at different angles relative to each other in such a configuration where the sum of the sensors' narrow fields of view cover a larger solid angle. However, this complexity increases the cost of the detector, and applications which use infrared detectors are often cost-sensitive applications.

SUMMARY OF THE INVENTION

The present invention provides a method and apparatus for increasing the effective field of view of a detector in a cost-effective manner. The present invention utilizes one or more lenses and a mirrored conic section or faceted mirror to reflect infrared radiation onto a pyro-electric sensor yielding a field of view with a solid angle equal to or exceeding a hemisphere.

According to one aspect of the invention, a pyro-electric sensor is mounted behind an optical lens arrangement which focuses beams of radiation onto a sensor. A hollow, truncated cone, mirrored on its outside surface is mounted between the lenses and the sensor, with the axis of the cone intersecting the center of the sensor. The cone is truncated to allow the sensor an unobstructed forward view as well as reflected side views.

According to another aspect of the invention, the cone is made up of a plurality of facets, with each facet at such an angle so as to focus the radiation passing through the lenses onto the sensor.

Other variations are also envisioned. For example, a Fresnel lens can be used for the lens arrangement. Also, the detector comprising the lens, sensor, cone and necessary electronic circuitry can all be encased in a plastic enclosure which would be mountable to the outside of a wall or ceiling, or into a standard junction box. In another variation, the forward view with respect to the sensor is not important, and therefore an untruncated cone is used. In yet another variation, a half cone is used to provide a semicircular view, such as when the sensor is mounted on a wall. The half cone is either round or a multi-faceted approximation to a cone formed of flat, triangular facets.

A further understanding of the nature and advantages of the invention may be realized by reference to the remaining portions of the specification and the drawings.

DESCRIPTION OF THE PREFERRED EMBODIMENT

Figure 1:
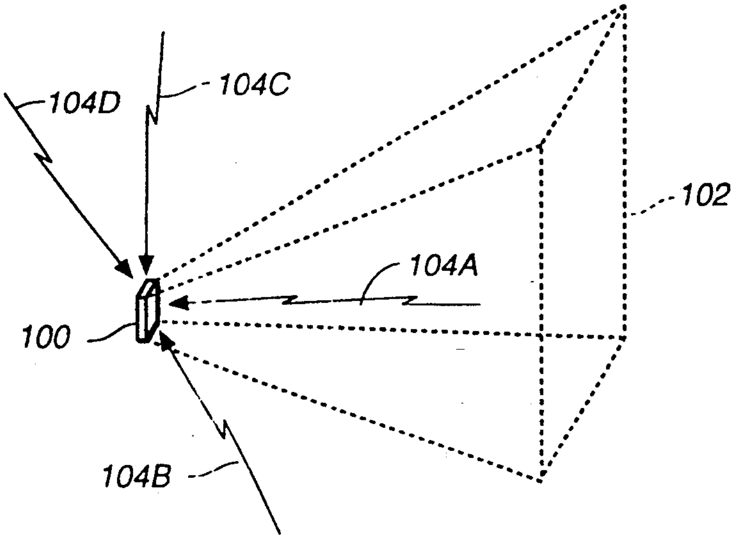
FIG. 1 (PRIOR ART)
FIG. 1 is a prior art illustration of the field of view of a pyro-electric sensor.

Referring to FIG. 1, a sensor 100 has a field of view 102. The field of view is generally determined by the geometry of the sensor and is measured as a solid angle. This geometry dictates that a beam 104A falling within field of view 102 is more readily sensed by sensor 100 than a beam falling outside field of view 102. At extreme angles, some beams 104C, 104D cannot be sensed at all by sensor 100. This "blind spot" is undesirable in PIR detectors for the reasons mentioned previously.

For illustration purposes, the sensitivity of sensor 100 is shown in the various figures being more or less uniform inside a solid angle and zero outside the solid angle. In practice, the sensitivity of the sensor drops off continuously from a peak on a line normal to the plane of the sensor to zero on a line parallel to the plane of the sensor. Nevertheless, the concepts and techniques discussed here are equally valid regardless of the sensitivity function, so long as there exist solid angles of high sensitivity and areas of low sensitivity.

Figure 2:
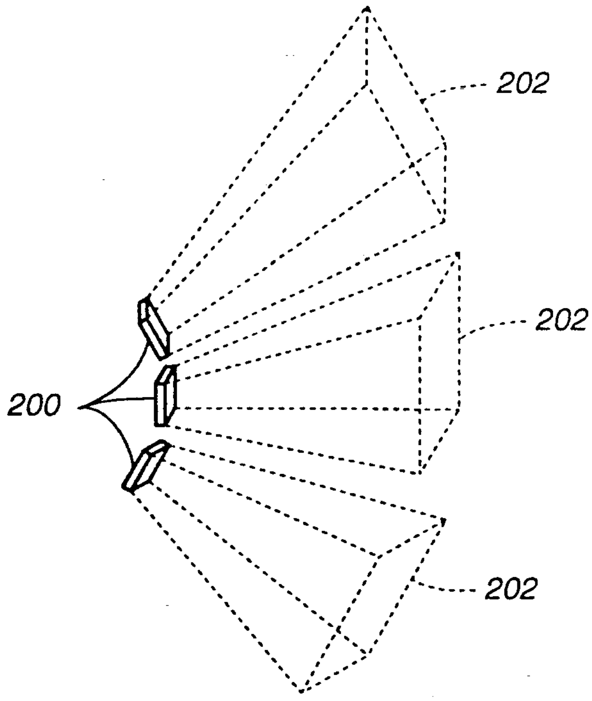
FIG. 2 is a prior art illustration of the field of view of a detector having several sensors.

FIG. 2 shows a prior art partial solution to the problem of blind spots. Sensors 200A–C, when combined, have less of a blind spot since their combination has a field of view three times as great as one sensor alone has, namely fields of view 202A, 202B, and 202C. Only three sensors are shown in FIG. 2 by way of illustration, but more may be required depending on the sensitivity functions of the particular sensors and what solid angle must be covered.

Figure 3:
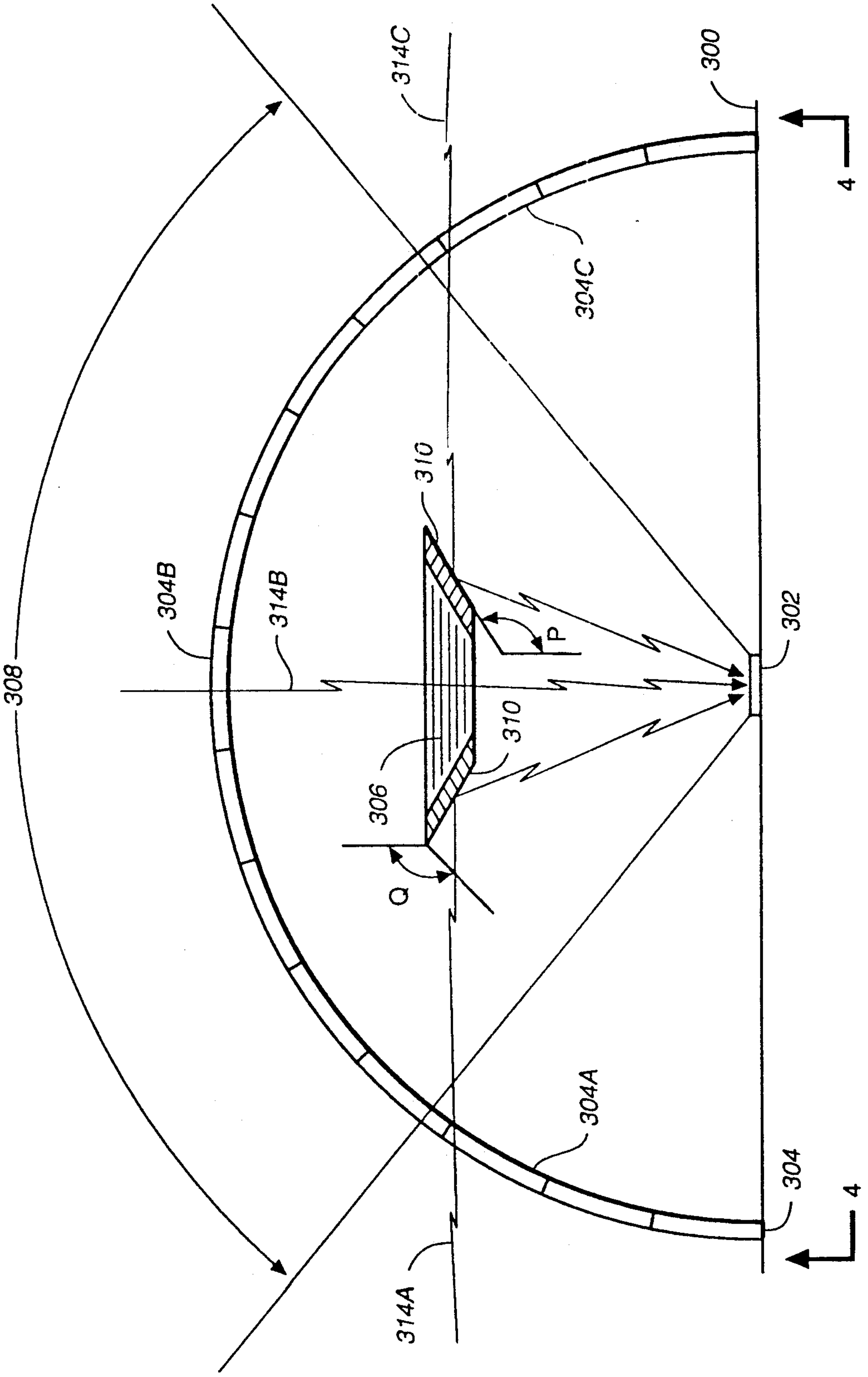
FIG. 3 is a cross-sectional view from the top of a PIR detector.

FIG. 3 is a top cross-sectional view of a PIR detector 300 which can sense radiation across a wide solid angle using only a single sensor. A pyro-electric sensor 302 provides an input to electronic circuitry (not shown), where such input is a function of the amount of infrared radiation falling on sensor 302. Typically, the radiation is infrared, but the present invention will work equally well with other ranges of electromagnetic magnetic radiation, such as visible light.

An optical lens arrangement 304 focuses the incoming radiation. For example, lens 304B focuses beam 314B onto sensor 302. Sensor 302 has a relatively narrow field of view 308, and therefore some lenses, such as lenses 304A and 304C cannot focus radiation directly onto sensor 302. To allow sensor 302 to sense these beams, mounted between sensor 302 and lens arrangement 304 is a hollow, truncated cone 306. The axis of cone 306 intersects sensor 302 normal to the sensor's center, and the mirrored surface 310 on the outside of cone 306 is mirrored to reflect radiation from portions of lens arrangement 304 onto sensor 302. Lenses 304A and 304C are constructed so that beams of radiation 314A, 314C will focus onto sensor 302 after being reflected off of mirrored surface 310. After reflection, beams 314A, 314C are within field of view 308.

Angle P is the slope of cone 306 relative to its axis, and determines the effective field of view of the PIR detector 300. As can be seen by the illustration in FIG. 3, angle Q, the effective field of view, is dependent on angle P. Thus, by varying angle P, angle Q can be varied. It can be seen that by decreasing angle P to nearly 90 degrees will make angle Q increase to almost 180 degrees, giving a field of view encompassing a solid angle of almost an entire sphere.

Figure 4:
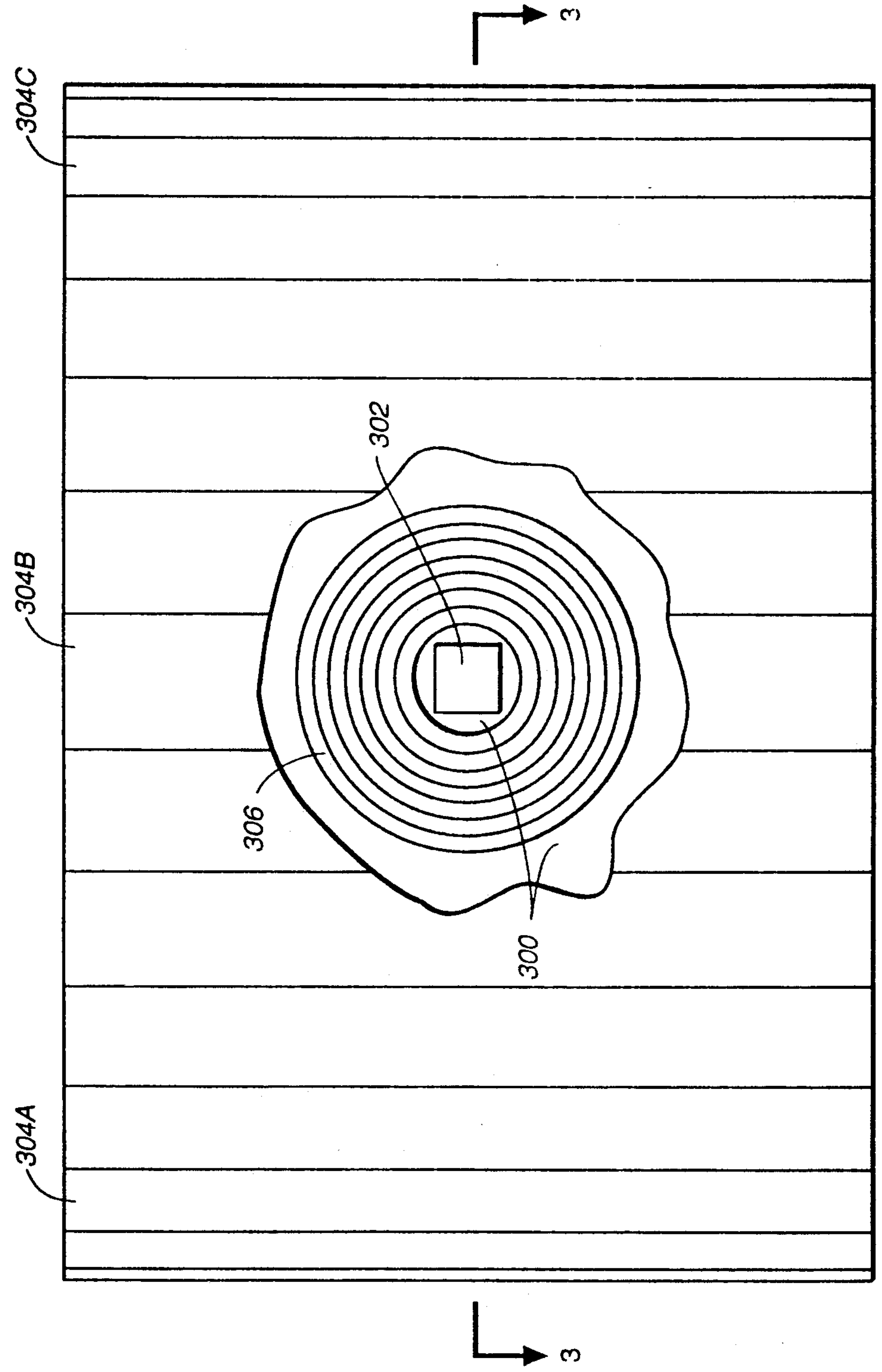
FIG. 4 is a front view of the PIR detector, with the lens shown partially cut away for clarity.

FIG. 4 is a front, outside view of PIR detector 300, with part of lens arrangement 304 cut away for clarity. Because of the opening in cone 306, radiation from in front of PIR detector 300 can reach sensor 302, and is not blocked by cone 306.

Figure 5:
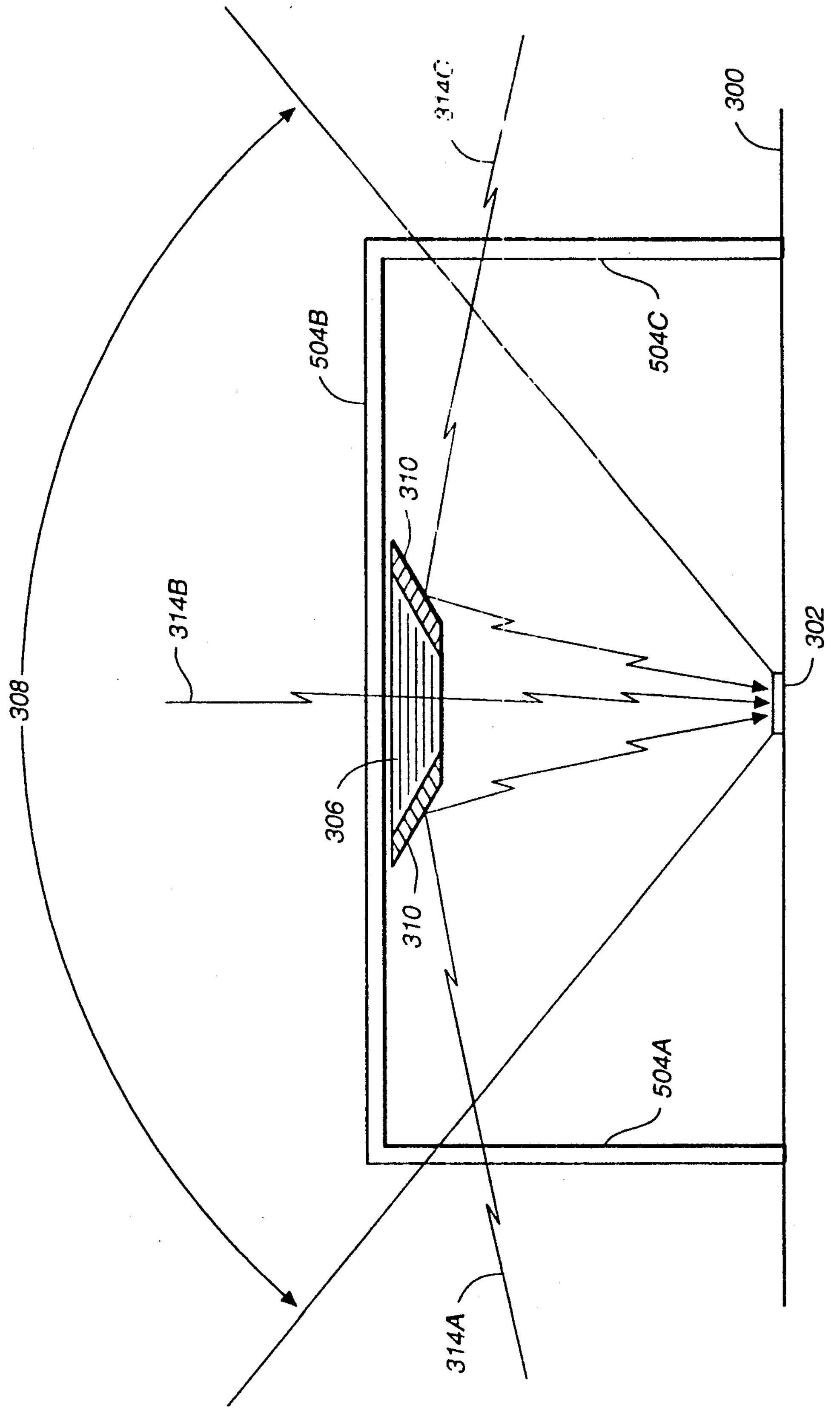
FIG. 5 is a cross-sectional view from the top of a PIR detector having a square lens housing.

FIG. 5 shows PIR detector 300 where the lens arrangement 304 is replaced with three flat lenses 504A, 504B, and 504C. Beam 314B passing through lens 504B is within field of view 308, whereas beams 314A and 314C passing through lenses 504A and 504C are outside field of view 308. Beams 314A and 314C are therefore reflected off mirrored surface 310 and onto sensor 302, such reflection putting the beams within field of view 308.

Figure 6:
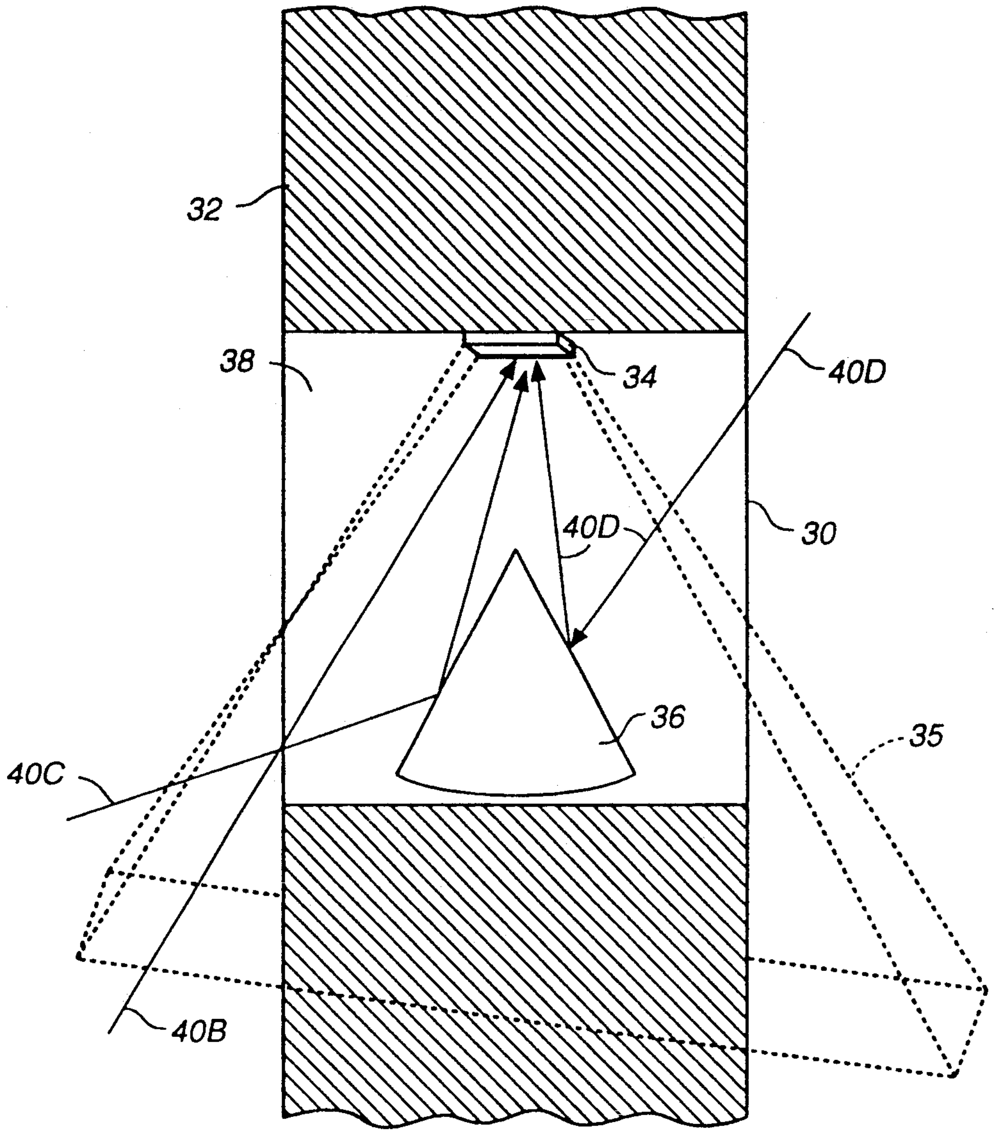
FIG. 6 is a side view of a PIR detector using an untruncated cone.
Figure 8A:
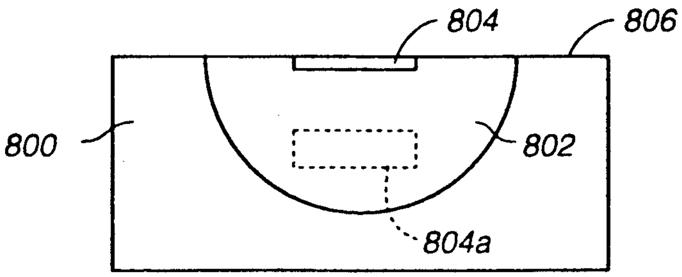
FIGS. 8 and 8(A) are top and side views of a PIR detector using a half cone.

FIG. 6 shows a PIR detector 30 mounted in a light pole 32, however PIR detector 30 could have been mounted anywhere where the sensor does not need a forward view. A sensor 34 with a field of view 35 is mounted on the top of PIR detector 30, and mirrored cone 36 serves to direct radiation beams 4OA-D onto sensor 34, thereby increasing the sensor's effective field of view beyond field of view 35. With suitable lens arrangement 38 light from nearly any spherical direction is reflected onto sensor 34.

Light directly below the sensor is totally blocked by not only mirrored cone 36 but post 32. If the need exists for a field of view including the area directly in front of the sensor (straight down in FIG. 6), the arrangement of a hollow cone truncated at its tip as shown in FIG. 3 would be more suitable for that application.

Figure 7:
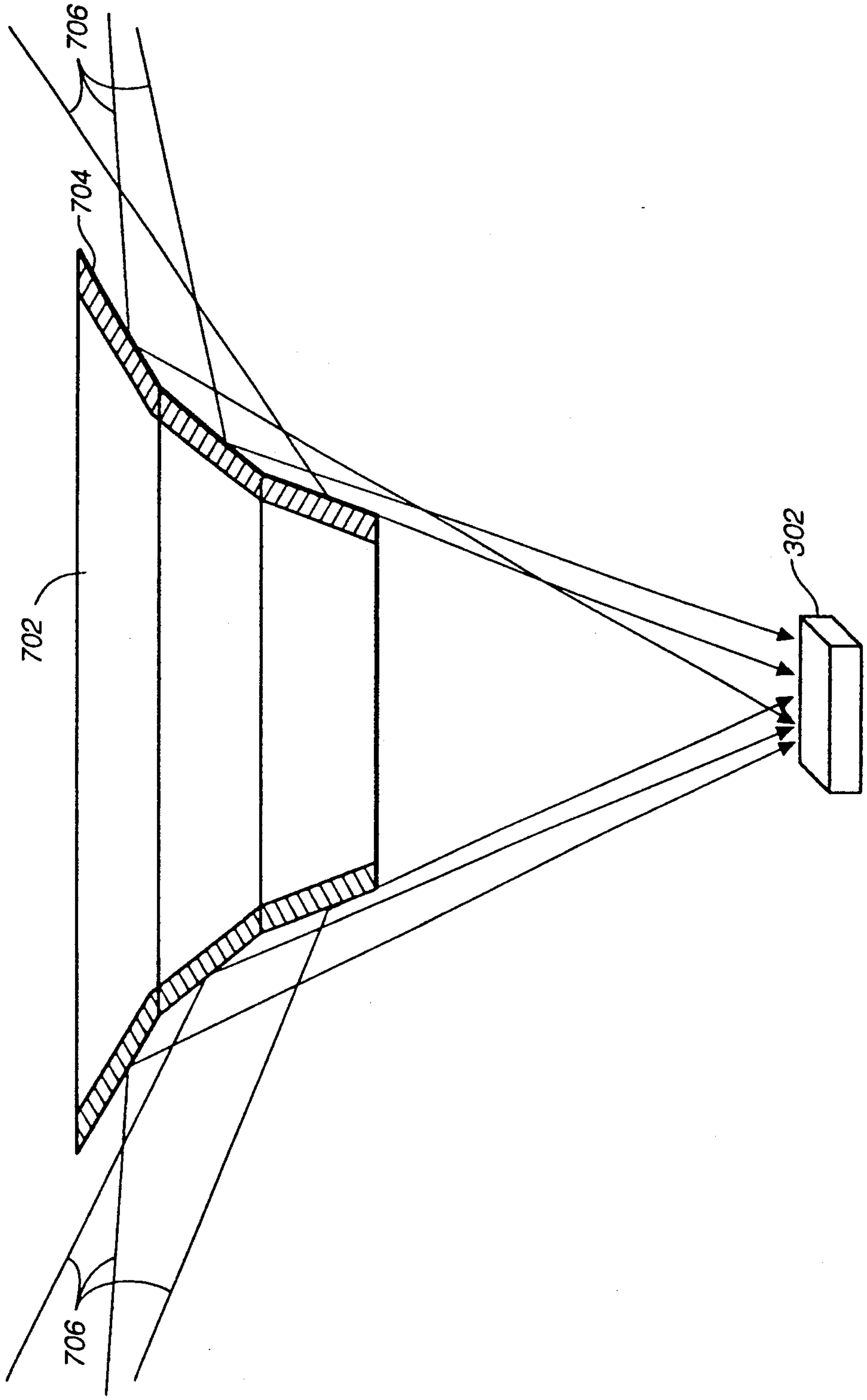
FIG. 7 is a cross-sectional view of a sensor and a multi-faceted mirror surface.

FIG. 7 shows another variation, where a cone 702 is modified so that a mirrored surface 704 formed on the outside of the modified cone focusses incoming beams 706 onto sensor 302, thus eliminating the need for a lens arrangement.

Figure 8:
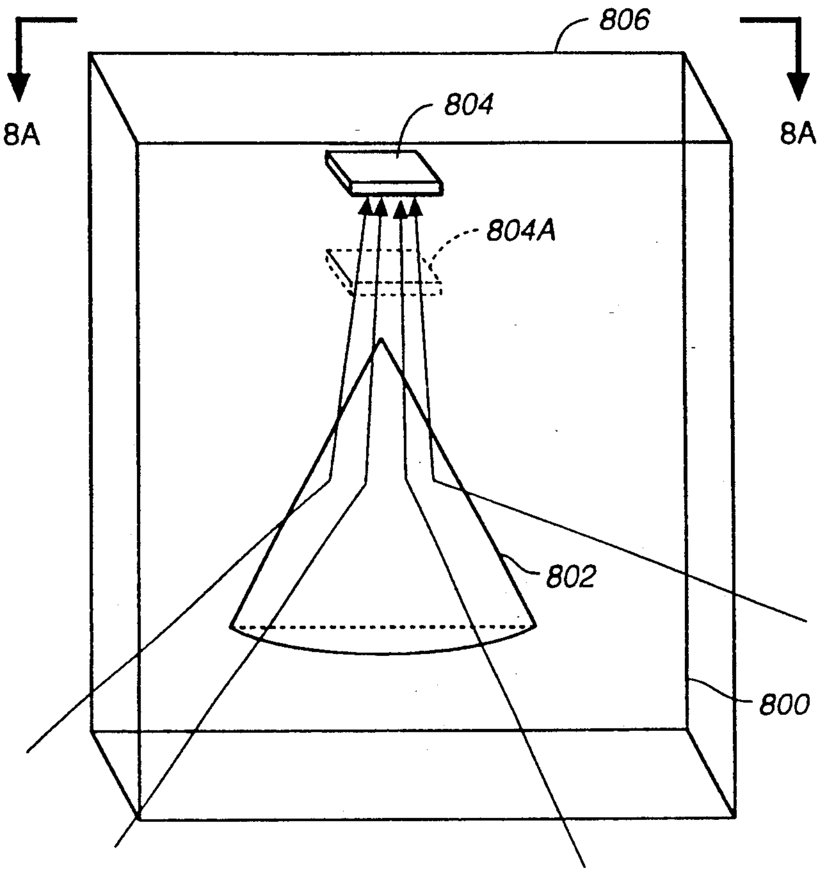

FIG. 8 shows the variation where a half cone 802 is used to channel radiation onto sensor 804. Since PIR detector 800 is mounted on a wall 806, only 180° of view is needed, and this view is adequately provided by half cone 802. One benefit of this arrangement is that alignment is simplified, since sensor 804 and half cone 802 can be aligned merely by placing them flush with wall 806. FIG. 8 also shows an alternate placement (804a) for sensor 804. The alternate placement provides a more directable field of view.

Figure 9:
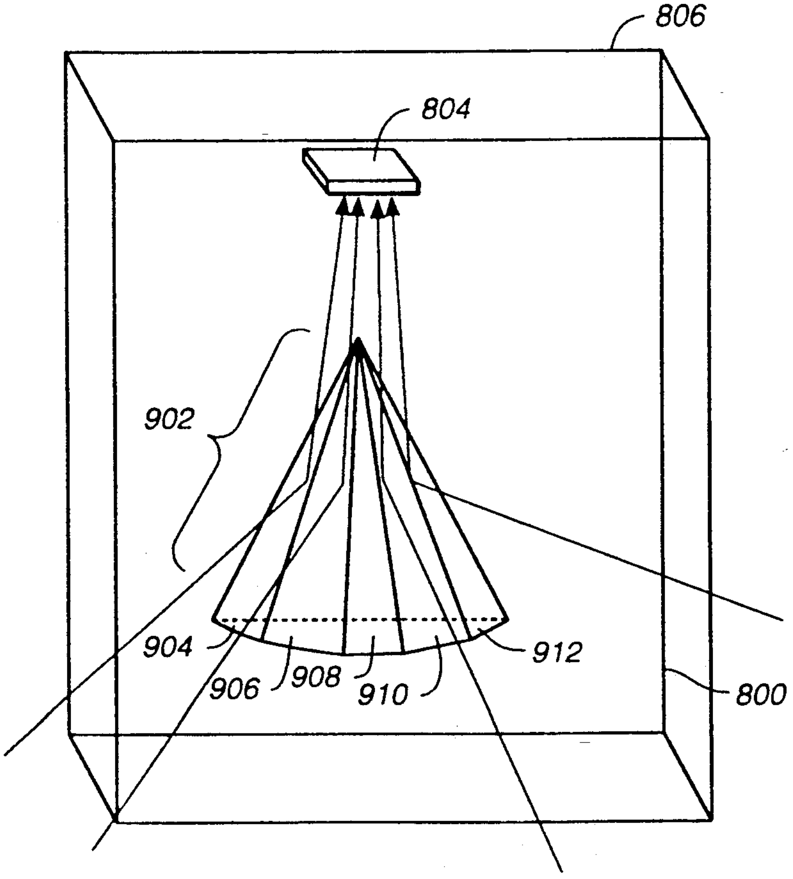
FIG. 9 is a side view of a PIR detector using triangular facets.
Figure 8:
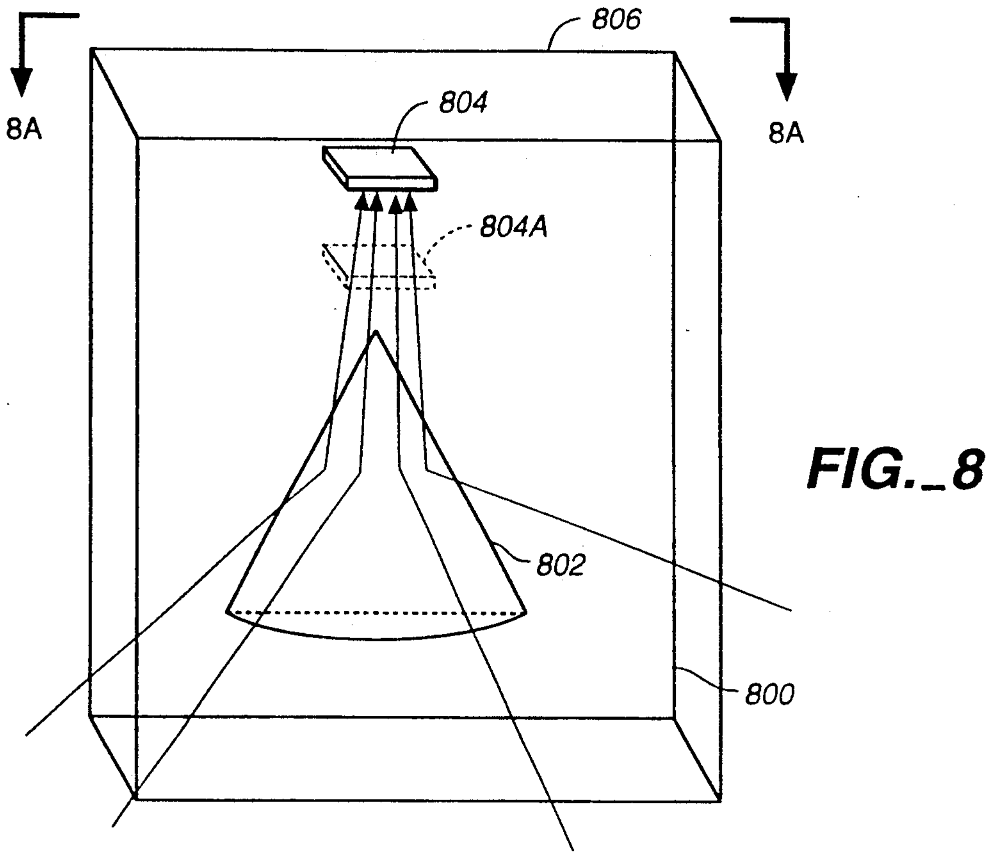
Figure 9:
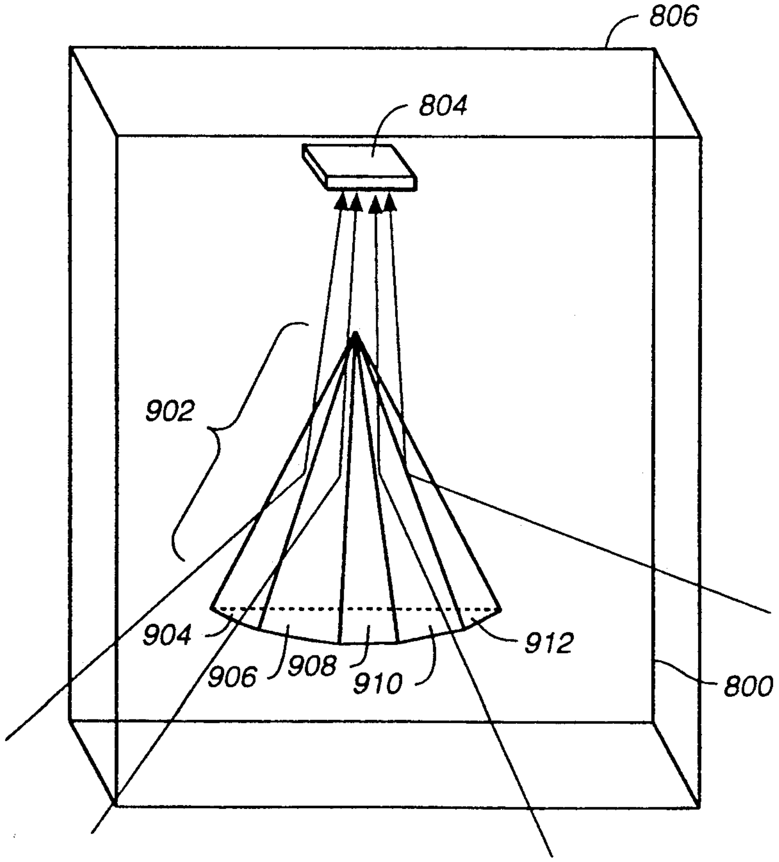

FIG. 9 shows a reflector 902 similar to the half cone 802 shown in FIG. 8. However, reflector 902 comprises flat facets 904-912 forming an approximation of a half cone.

In conclusion, the present invention provides for simple, low-cost infrared detectors having wide angles of view using only one sensor. While the above is a complete description of several preferred embodiments of the invention, various alternatives, modifications and equivalents may be used. To those skilled in the art it can be seen that minor modifications can be made to the present invention and still be within the spirit and scope of the invention, which is defined by the appended claims.

What is claimed is:

1. In an infrared radiation detector having a housing and at least one sensor mounted within the housing for sensing infrared radiation, the detector having a limited field of view, the improvement comprising:

a truncated conical mirror having a central aperture and having an exterior conical reflective surface, wherein said truncated conical mirror is disposed within the housing in front of the at least one sensor to reflect infrared radiation incident upon said reflective surface from outside the limited field of view of the detector directly to the at least one sensor, and said central aperture of said truncated conical mirror is disposed opposite the at least one sensor to permit infrared radiation to pass through said aperture directly to the at least one sensor, whereby the overall effective field of view of the detector is increased without loss of field of view directly in front of the at least one sensor.

2. The detector of claim 1 further comprising a plurality of Fresnel lenses arranged to direct infrared radiation to the at least one sensor, wherein said truncated conical mirror is disposed between said plurality of Fresnel lenses and the at least one sensor.

3. The detector of claim 1 wherein said conical mirror is formed of a plurality of reflective facets arranged to define a varying cone angle.

4. The detector of claim 1 wherein said conical mirror is formed of a plurality of planar reflective segments.

5. In an infrared radiation detector having a housing and at least one sensor mounted within the housing for sensing infrared radiation, the detector having a limited field of view, the improvement comprising:

a conical mirror having an exterior conical reflective surface wherein said conical mirror is formed of a plurality of reflective facets arranged to define a varying cone angle, and said conical mirror is disposed within the housing to reflect infrared radiation incident upon said reflective surface from outside the limited field of view of the detector directly to the at least one sensor, whereby the overall effective field of view of the detector is increased.

6. An infrared radiation detector for mounting on a vertical wall, comprising:

a housing;

at least one sensor mounted within the housing at the top thereof for sensing infrared radiation; and a half-conical mirror defining a longitudinal cone axis and having an exterior reflective surface in the shape of a half-cone wherein said half-conical mirror is mounted within said housing with said cone axis oriented vertically and aligned with the at least one sensor, whereby said reflective surface faces generally sideways and reflects infrared radiation directed at the detector from a wide cone angle to said at least one sensor.

7. The detector of claim 6 wherein said half-conical mirror is formed of a plurality of reflective facets arranged to define a varying cone angle, whereby the overall effective field of view of the detector is increased.

8. The detector of claim 6 wherein said half-conical mirror is formed of a plurality of planar reflective segments.

9. The detector of claim 6 wherein said half-conical mirror is truncated and formed with a central aperture aligned with said cone axis, and said aperture is disposed opposite the at least one sensor to permit infrared radiation to pass through said aperture directly to the at least one sensor from the area generally underneath the detector when the detector is mounted on a vertical wall.

* * * * *